J. WESTINGHOUSE.
LINKS FOR ENDLESS-CHAIN HORSE-POWERS.
No. 191,211. Patented May 22, 1877.
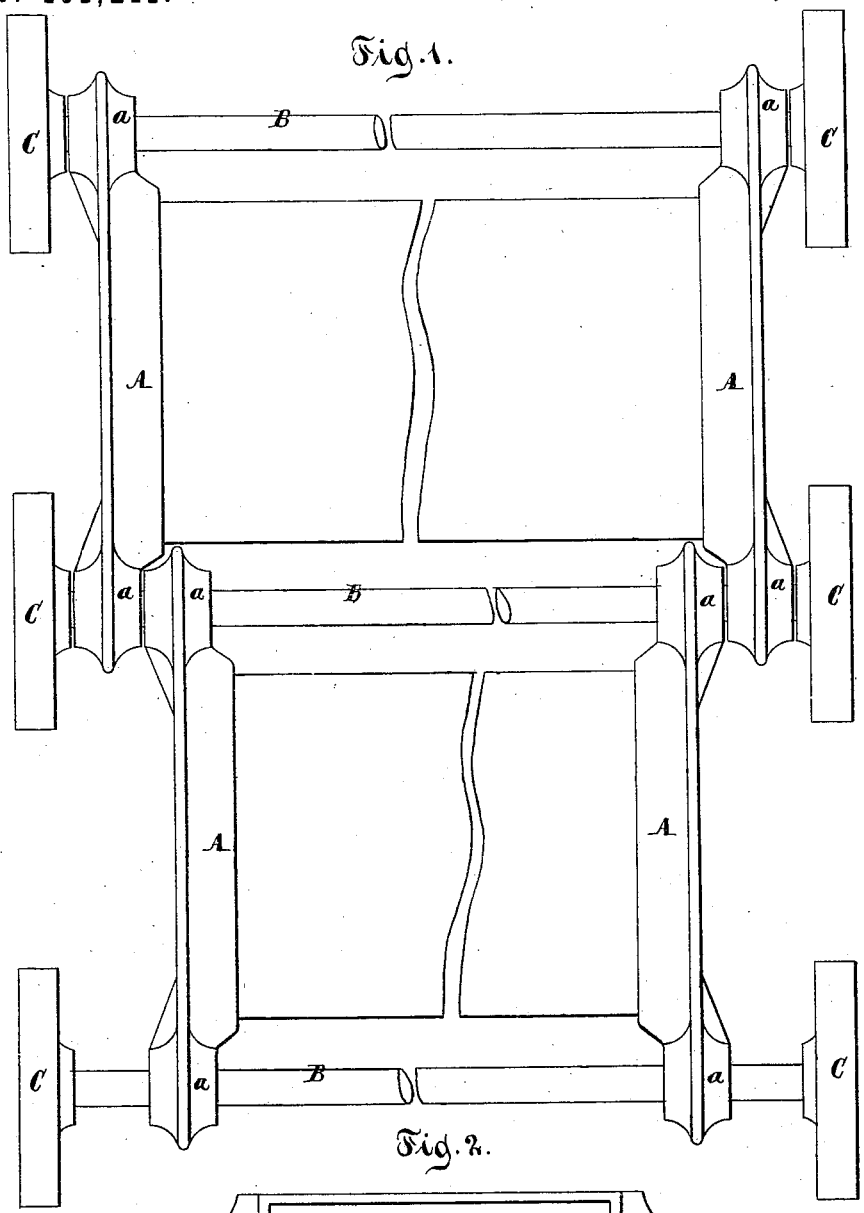

UNITED STATES PATENT OFFICE.

JAY WESTINGHOUSE, OF SCHENECTADY, NEW YORK.

IMPROVEMENT IN LINKS FOR ENDLESS-CHAIN HORSE-POWERS.

Specification forming part of Letters Patent No. 191,211, dated May 22, 1877; application filed March 22, 1877.

*To all whom it may concern:*

Be it known that I, JAY WESTINGHOUSE, of the city and county of Schenectady, in the State of New York, have invented a new and useful Improvement in Links for Endless-Chain Horse-Powers, which is fully set forth in the following specification, reference being had to the accompanying drawing, in which—

Figure 1 represents a plan or top view of a portion of the endless-chain platform. Fig. 2 is a side elevation of one of the links. Fig. 3 is a section in the plane $x\,x$, Fig. 2.

Similar letters indicate corresponding parts.

This invention consists in the combination of a lining of steel, or other suitable hard substance, with the eyes of the links in the platform of an endless-chain horse-power, said eyes being provided with segmental recesses for the reception of the lining, so that those portions of said eyes which are exposed to the strain of the transverse shafts are protected against wear, and an endless-chain platform is obtained, which is not liable to get out of repair for a long time. The segmental linings are retained in position in the eyes by friction, and they are locked in by means of spurs cast on the eyes and turned down over the edges of the linings.

In the drawing, the letter A designates one of the links which are used in the construction of an endless-chain platform, such as shown in Fig. 1 of the drawing. By referring to this figure it will be seen that the links A form the connections between transverse shafts B, on the ends of which are mounted pulleys or wheels C, said transverse shafts being made to engage with chain-wheels, which I have not shown in the drawing. If the platform is caused to move in either direction, the strain of the transverse shafts B comes on the outer surfaces of the eyes $a\,a$ of the links A, and as these outer surfaces wear the distance between the successive transverse shafts B increases, and the correct operation of these shafts on the chain-wheels is disturbed.

This difficulty I have sought to overcome by providing each eye with a segmental recess, $b$, on that side which has to sustain the strain of the transverse shaft passing through said eye. All these recesses are cast or otherwise produced with a slight draft, and they are intended for the reception of segmental linings $c$, of steel or other suitable hard material, formed to fit the recesses, and to be driven down into them, as shown in Figs. 2 and 3. When properly fitted, said linings will be retained in their recesses by friction; but, in order to retain them positively in position, I cast the eyes $a$ with lugs or spurs $d$, which are turned down, as shown in Figs. 2 and 3, after the linings have been driven home.

By these means those portions of the eyes which have to sustain the strain of the transverse shafts B are protected against wear, and said shafts are enabled to maintain the correct distance from each other for a long time.

I am aware that the hooked ends of the links composing an endless-chain horse-power have been lined with Babbitt metal; but such is not my invention, and is, moreover, objectionable, for the reason that it is a very soft metal, and soon wears, requiring frequent renewal, which is a source of much expense and annoyance, whereas by my invention the lining will not require repair for a great length of time, and, besides, the eyes are protected from wear, which would not be the case with a soft metal like Babbitt metal.

What I claim as new, and desire to secure by Letters Patent, is—

1. The combination of linings of steel, or other suitable hard substance, with the eyes $a$ of a link, A, said eyes being provided with segmental recesses for the reception of the linings, substantially as and for the purpose shown and described.

2. The combination, with the segmental linings $c$ and with the eyes $a$, of spurs $d$, for retaining the linings in position, substantially as set forth.

In testimony that I claim the foregoing I have hereunto set my hand and seal this 12th day of March, 1877.

JAY WESTINGHOUSE. [L. S.]

Witnesses:
FRANK J. ATWELL,
D. A. ATWELL.